A. FREYDBERG.
APPARATUS FOR CUTTING CLOTH OR OTHER FABRICS.
APPLICATION FILED MAY 2, 1918.
1,275,899.
Patented Aug. 13, 1918.
2 SHEETS—SHEET 1.
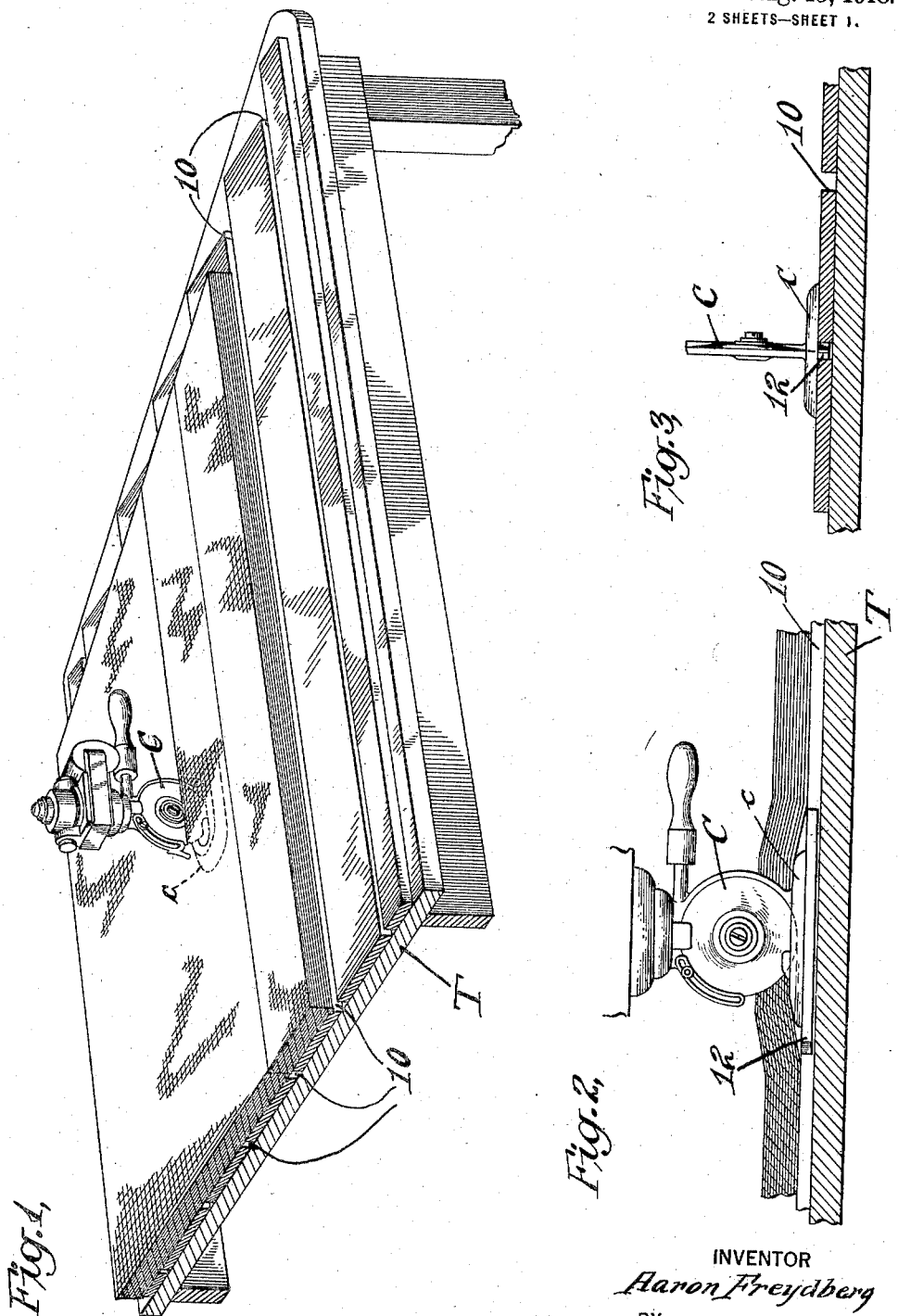
INVENTOR
Aaron Freydberg
BY
Meyers. Cushman & Rea
ATTORNEY

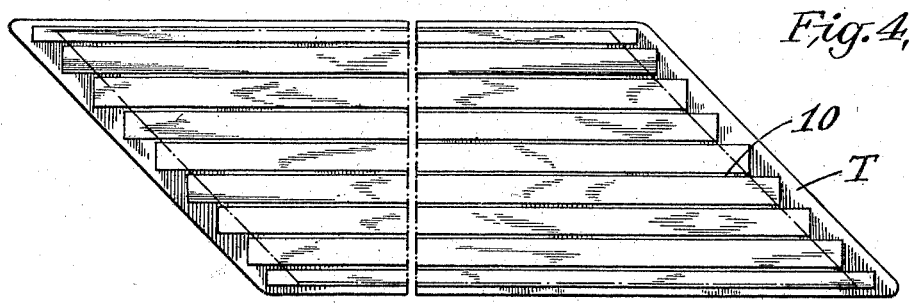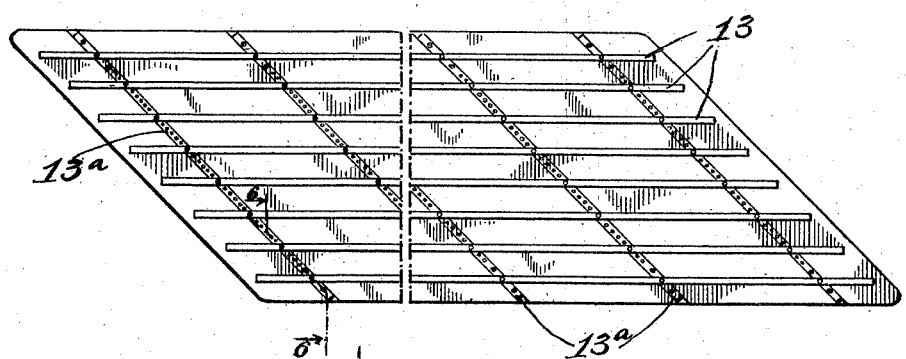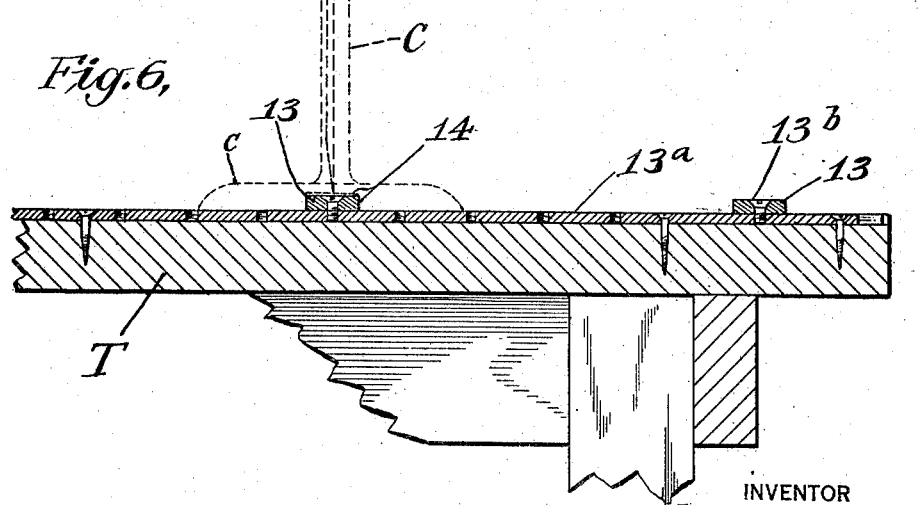

UNITED STATES PATENT OFFICE.

AARON FREYDBERG, OF NEW YORK, N. Y.

APPARATUS FOR CUTTING CLOTH OR OTHER FABRICS.

1,275,899.      Specification of Letters Patent.      Patented Aug. 13, 1918.

Application filed May 2, 1918. Serial No. 232,039.

*To all whom it may concern:*

Be it known that I, AARON FREYDBERG, a citizen of the United States, residing at New York, in the county of New York and State of New York, have invented new and useful Improvements in Apparatus for Cutting Cloth or other Fabrics, of which the following is a specification.

This invention relates to improvements in apparatus for cutting cloth or other fabrics, and pertains more particularly to means for cutting or slitting lays of material.

My present invention is designed more particularly for facilitating the production of biased strips—as for instance material for bandages—in an efficient and economical manner, although not limited to this particular use.

Strips for bandaging purposes for various reasons are cut on the bias, and to facilitate the production it is a general practice to arrange a number of widths of the piece material side by side and connect these widths at their edges to produce the strip length by the width of the connected pieces of material, the line of cutting to form the strip lengths being in a direction angular or biased relative to the secured edges of the pieces, thus causing the entire length of the strip to be "on the bias." The "layer length", corresponding to the strip length, therefore differs from the piece length, these lengths being inclined to each other by reason of the biasing cut, the layer width extending in the direction of length of the piece, although biased with respect thereto.

For the purpose of producing the strips in quantity, it is the general practice to superpose a number of these layers, thus forming a lay, the lay having a length equal to the length of the strips, the width of the lay being dependent upon operating conditions. After the lay is formed, the top layer is marked with guide lines, and a suitable lay cutter employed for cutting the several plies or layers at a single operation, the cutter being caused to follow the guide lines carried by the upper exposed lay.

Several difficulties result from this type of operation, these difficulties tending to increase the cost of operation, decrease the size of the layer, and to possibly render the product unserviceable by reason of inaccurate cutting. These difficulties will be appreciated when it is considered that these strips are approximately 15 feet long and of relatively narrow width. This requires a table or support for the lay at least equal to that of the length of the lay, so that one difficulty appears in producing the marking of the lay, a straight edge or other templet being utilized, this templet being generally of greater length than the length of the lay, thus causing the marking operation to be one more or less difficult and time-wasting by reason of the accuracy required. After the lay has been marked, the cutting apparatus is advanced by an operator along the guide mark—lengthwise of the lay—to produce the strip-like product. As will be understood, the length of the strip is such as to require the operator to travel the length of the table or support, moving along the side of the table and attempting to advance the cutting apparatus while moving at one side of or substantially parallel with the path of advancing travel of the apparatus, it being obviously impossible to provide the apparatus-advancing movements while the operator is directly in rear of the apparatus due to the length of the cut which is required. While this is a more or less difficult operation when the apparatus is moving close to the edge of the table—practically requiring expert operators to produce a satisfactory substantially straight cut—this difficulty is greatly increased as the successive removal of strips carries the succeeding line of cut toward the center of the table, and cutting at such point is a difficult matter by reason of the difficulty of advancing the apparatus at such distance from the side of the table and at the same time attempting to closely follow a predetermined mark. In order to avoid this difficulty, it is the practice to provide the cutting operations successively from one side toward the center and then move the mechanism to the opposite side of the table and duplicate the operations on that side. However, under the most favorable conditions of the latter type of operation, it is practically impossible to obtain satisfactory results where the width of the lay exceeds practically 40 inches, due to the fact that the central portion, while within the reaching limits of an operator, is of a distance which practically prevents any accurate following of a marking line.

Obviously, this difficulty has practically limited the width of the lay, and since the width of the lay is practically produced from the direction of length of the piece, this limitation necessitates the cutting of the material into comparatively short lengths.

The present invention is designed to overcome these objectionable features by eliminating the necessity for marking the lay and by providing complemental guide elements on the table and cutting apparatus, these guide elements being arranged to cause the cutting apparatus to traverse the table on lines which correspond to the proper width of strips, thus automatically insuring that the apparatus will travel in a predetermined path and insure accuracy in the strip width, and at the same time permit of the operation being performed by an unskilled operator, since the only requirement is to advance the apparatus. This not only eliminates the necessity for marking the lay and for attempting to follow the guide mark while advancing the cutting apparatus, but, in addition, produces another important advantage in that it materially increases the width within which an operator can provide the successive cutting operations, since the elimination of the necessity of following a guide mark enables the cutting apparatus to be advanced at any point within the reach of the operator. For instance, it has been found, in practice, that it is possible to readily provide all of the cutting operations on a lay having a width of 68 or 70 inches instead of the 40 inches of the prior practice. As will be understood, this increase in width of the lay—exceeding 50%—is of a decided advantage, in that the piece length is correspondingly increased, and therefore substantially 50% increase in number of strips can be produced from a single lay, assuming the strips in both cases are of similar width. In other words, it is possible to produce a similar number of strips from two lays as have heretofore been obtainable from three lays, thus not only decreasing the amount of cutting required to produce the layers, but also decreasing the time required in producing lays. Consequently, the invention not only insures greater accuracy in the production of strips of uniform width, but also decreases the cost of manufacture through the ability to substitute inexpert labor for the expert and provides for a material saving in time and labor in producing the product, the ability to dispense with the use of guide marks on the lay materially aiding in this respect.

To these and other ends, therefore, the nature of which will be readily understood as the invention is hereinafter disclosed, said invention consists in the improved construction and combination of parts hereinafter more fully described, illustrated in the accompanying drawings and more particularly pointed out in the appended claims.

In the accompanying drawings, in which similar reference characters indicate similar parts in each of the views:—

Figure 1 is a perspective view, partly in section showing one embodiment of my invention, the view indicating the manner of use.

Fig. 2 is a detail sectional view taken lengthwise of the table of Fig. 1.

Fig. 3 is a detail sectional view taken on a line transverse to the line of section of Fig. 2.

Fig. 4 is a top plan of the table or support of Fig. 1.

Fig. 5 is a top plan view of a modified form of table or support.

Fig. 6 is a detail sectional view on line 6—6 of Fig. 5.

The apparatus, as preferably employed for the purpose heretofore indicated, substantially comprises two elements, the table or support for the lay, and the cutting instrumentality or mechanism, the latter being of any preferred type, that generally employed being in the form of a rotating cutter mechanism operated by a motor and mounted on a pedestal having a face which is adapted to rest upon the top surface of the table and be freely movable thereover. The cutting instrumentality is not specifically described, being indicated generally in the drawings at C, the base or pedestal being indicated at c. In these power-driven devices, the instrumentality generally has a suitable handle by means of which it can be moved over the table surface, the pedestal resting upon such surface beneath the lay.

While not absolutely essential, the table or support T preferably has the contour of a rhomboid, the ends being inclined or biased relative to the opposite parallel sides, the length of the table being sufficient to receive the length of the lay, the latter also being preferably rhomboidal in contour where the product is to be cut on the bias. Likewise, the width of the table is sufficient to receive the width of the lay which, for reasons heretofore pointed out, is of materially greater width than that of the lays heretofore capable of use for the purpose.

To permit of this increase in width in table and lay and to eliminate the necessity for preliminarily marking the lay as well as to make possible the use of unskilled labor in producing the cutting or slitting operations, I preferably provide complemental means on the lay-supporting surface of the table and on the base of the cutting instrumentality or mechanism by means of which said mechanism is guided by the means to move on predetermined lines so that it is necessary only to locate the lay on the table or support with the edge of the lay extending on a desired line and then simply advance the cutting mechanism lengthwise of the table while said complemental means is active.

This complemental means may be of various types. For instance, as indicated in Figs. 1 to 4, the table may be formed in such manner as to produce longitudinal grooves or recesses 10. These may be provided by grooving or recessing the table top or by the use of strips of wood or metal of the desired width, these strips being arranged in spaced relation and secured to the top surface of the table in such manner as to produce the grooved or recessed effect. The advantage of this latter manner of producing the grooves or recesses lies in the fact that where it is desired to change the width of the slitted product or it be desired to produce strips of fabric of different widths, table strips of one width may be substituted for similar strips of a different width, it being understood, of course, that in such changes the width of the recess or groove is preferably the same in each case. Where the product is to be in the form of a strip of uniform width, it will be understood that the grooves or recesses will extend parallel with each other and are preferably arranged parallel to the line along which one side edge of the lay is positioned—this line may be a longitudinal side edge of the table.

An effect somewhat similar to the adjustment indicated may be obtained without substitution of strips by providing the lay-supporting surface with a comparatively large number of grooves or recesses located at predetermined distances apart—as for instance forming several grooves within the space occupied by a table strip in Figs. 1 or 3—the number of grooves being greater than the number which it is desired to employ during the cutting operation. In such case, only the grooves at the proper points would be employed, and to eliminate liability of errors, those grooves which are not being utilized, would carry suitable indications which would give notice to the operator of such non-use. This indication may be provided in any desired way, as for instance by inserting a suitable stop or plug at the entrance to the grooves not to be used, this not only providing a visual indication to the operator, but also placing a physical element in the path of the complemental element of the cutting mechanism which is designed to traverse a groove or recess during the advancing movement of the mechanism.

To coöperate with the groove or recess type of guiding element carried by the table, I prefer to provide the cutting mechanism with a complemental guiding element which projects below the normal plane of the base $c$ of the mechanism. This element is indicated at 12, and may be in the form of an elongated bar secured to the mechanism to project below the base, or may be in the form of a plurality of short bars or pins arranged to provide an effect more or less equivalent to that of a single bar, it being understood, of course, that the element is so arranged as to cause the cutter or cutters to traverse a predetermined course in the direction of length of the table.

Another way in which the general results can be obtained is by providing the guiding element of the table by a plurality of wood or metal strips 13 of comparatively narrow width, these strips projecting above the normal plane of the table and secured to the table top, the strips being of uniform width and spaced apart proper distances, the spacing being determined by the width of the product. The spacing may be made variable by simply shifting the positions of the strips on the table top. A simple arrangement is to inlay metal strips $13^a$ in the table top, as in Figs. 5 and 6, these latter strips extending transverse to the length of the table and having openings to receive screws $13^b$ or other securing means extending through strips 13.

Where this latter type of structure is employed, the cutting instrumentality may have its base cut away to accommodate for a table strip, the major portion of the base resting upon the table top, the table strips coöperating with the base recesses—indicated at 14 in the drawings—for guiding the instrumentality in its advancing movements.

In either case, it will be understood that the edge walls of the coöperating elements generally provide the guide control, the actual support for the instrumentality being the major surface of the table, thus forming an extended support for the base of the instrumentality and permitting free movements of the latter over the table, although the movements are restricted to predetermined lines. Hence, the width of the lay is restricted only by the length of reach of the operator, the resistance to advance of the instrumentality being small.

To retain the lay in position it is necessary only to employ weights scattered over the top layer, as usual.

The complemental means is preferably such as to permit free removal of the mechanism, the weight of the latter being generally sufficient to maintain its base on the table.

While I have herein shown and described various ways in which the invention may be put to use, it will be readily understood that variations and modifications therein may be required or desired to meet the exigencies of use, and I desire to be understood as reserving the right to make any and all such changes or modifications as may be found desirable or essential, in so far as the same may fall within the spirit and scope of the invention as expressed in the accompanying claims.

What I claim is:—

1. A cloth-shearing table having a cloth supporting surface of greater length than width provided with a plurality of spaced parallel guideways for guiding a cutting tool, the ends of the table being cut on a bias and the said guideways extending parallel with the long sides of the table.

2. A table or support for lay-cutting or slitting operations having a supporting surface of greater length than width and the ends thereof cut on a bias, said surface being provided with a plurality of spaced parallel guiding elements extending in the direction of length of the said surface, said guiding elements being laterally adjustable to vary the distance therebetween and the width of the slitted product, and means for retaining the elements in adjusted position.

3. A cloth cutting or slitting table having a supporting surface of rhomboidal contour, said surface being provided with a plurality of spaced guiding elements extending substantially parallel to the long sides of the surface.

In testimony whereof I have hereunto set my hand.

AARON FREYDBERG.

Copies of this patent may be obtained for five cents each, by addressing the "Commissioner of Patents, Washington, D. C."